United States Patent
Yi et al.

(10) Patent No.: US 9,432,345 B2
(45) Date of Patent: Aug. 30, 2016

(54) AUTHENTICATION ENGINE AND STREAM CIPHER ENGINE SHARING IN DIGITAL CONTENT PROTECTION ARCHITECTURES

(71) Applicant: Lattice Semiconductor Corporation, Portland, OR (US)

(72) Inventors: Ju Hwan Yi, Sunnyvale, CA (US); Wooseung Yang, San Jose, CA (US); Myung Je Cho, San Jose, CA (US); Hoon Choi, Mountain View, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 104 days.

(21) Appl. No.: 14/279,316

(22) Filed: May 16, 2014

(65) Prior Publication Data
US 2016/0119302 A1    Apr. 28, 2016

(51) Int. Cl.
  *H04L 9/32*  (2006.01)
  *H04L 29/06*  (2006.01)

(52) U.S. Cl.
  CPC ......... *H04L 63/061* (2013.01); *H04L 63/0457* (2013.01); *H04L 63/062* (2013.01); *H04L 63/126* (2013.01)

(58) Field of Classification Search
  CPC ............... H04L 2209/12; H04L 2209/605; H04L 9/065; H04L 9/0838; H04L 9/12; H04L 63/061; H04L 63/062; H04L 63/126; H04L 63/0457; H04L 9/3215; H04L 9/0631; H04L 9/0637; H04L 9/3213; H04L 9/3271; H04H 60/23
  USPC ................................................ 713/171, 168
  See application file for complete search history.

(56) References Cited

U.S. PATENT DOCUMENTS

| | | | | |
|---|---|---|---|---|
| 7,131,004 B1* | 10/2006 | Lyle | ......................... | H04L 9/12 348/E7.056 |
| 7,295,578 B1* | 11/2007 | Lyle | ......................... | G06F 3/14 348/473 |
| 8,671,444 B2* | 3/2014 | Kulkarni | ............. | H04L 63/0876 726/20 |
| 9,032,535 B2* | 5/2015 | Lin | ......................... | G06F 21/10 726/26 |
| 2004/0190868 A1* | 9/2004 | Nakano | .................... | G06F 21/10 386/234 |
| 2007/0003288 A1* | 1/2007 | Tong | .................... | G02B 6/0288 398/142 |
| 2007/0237332 A1* | 10/2007 | Lyle | ......................... | H04L 9/12 380/263 |
| 2013/0230296 A1* | 9/2013 | Yun | ....................... | G06F 21/606 386/230 |

FOREIGN PATENT DOCUMENTS

WO    WO 2007005743 A2 *    1/2007    ........... G02B 6/0288

* cited by examiner

*Primary Examiner* — Samson Lemma
(74) *Attorney, Agent, or Firm* — Fenwick & West LLP

(57) ABSTRACT

A system for receiving and decrypting media content encrypted according to the HDCP protocol is described herein. A receiving device coupled to a plurality of content channels includes an authentication engine to authenticate each content channel and to generate an initial session key associated with each authenticated content channel. The content channels can be, for example, an HDMI channel or an MHL3 channel. A session key indicator indicating a session key used to encrypt media content is received, and an updated session key is generated. The receiving device also includes a stream cipher engine configured to decrypt received encrypted media content using the updated session key. Decrypted media content can then be displayed, for instance on a display of the receiving device.

20 Claims, 4 Drawing Sheets

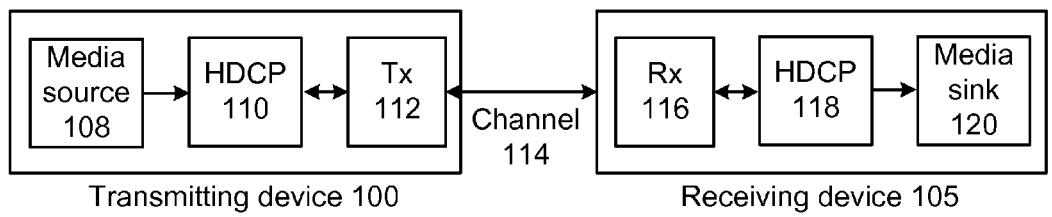
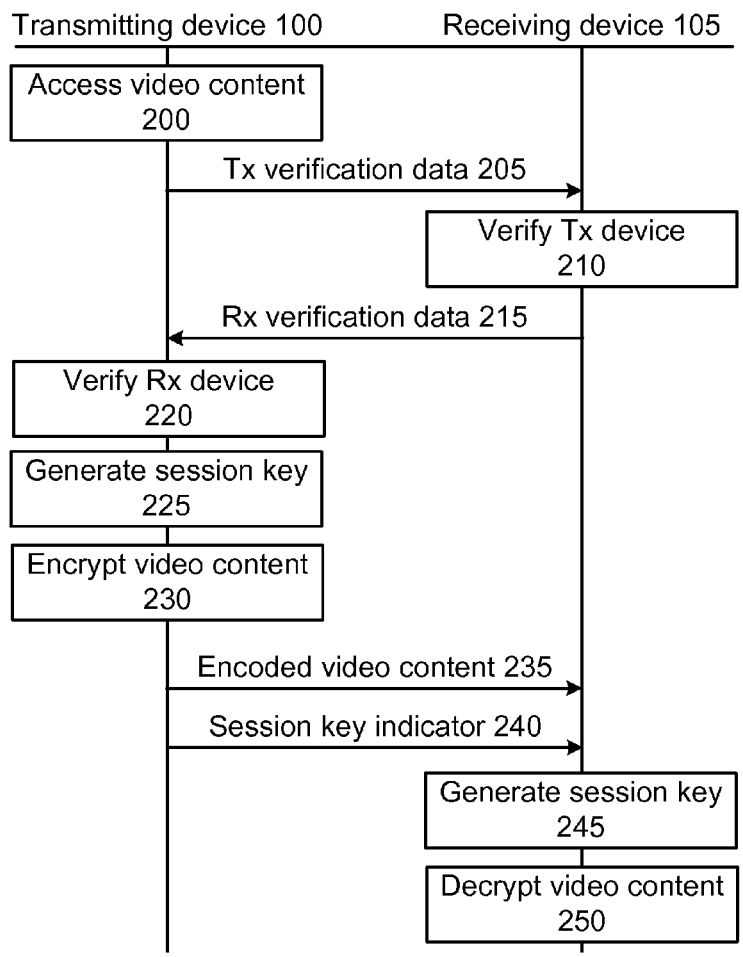
Figure 1
Figure 2

AUTHENTICATION ENGINE AND STREAM CIPHER ENGINE SHARING IN DIGITAL CONTENT PROTECTION ARCHITECTURES

RELATED APPLICATION

This patent application is related to U.S. patent application Ser. No. 12/392,000, filed Feb. 24, 2009, the contents of which are incorporated herein by reference in their entirety.

FIELD

Embodiments of the invention generally relate to the field of networks and, more particularly, to pre-authentication of media content ports.

BACKGROUND

Media data streamed for display can be protected using the High-bandwidth Digital Content Protection (HDCP) protocol. HDCP is a content protection protocol that is used to protect media content, particularly premium media content. For example, when there is a flow of content between a transmitting device (e.g., a DVD player) and a receiving device (e.g., a television) via the High-Definition Multimedia Interface (HDMI) channel or the Mobile High-Definition Link (such as MHL v. 3.0 or MHL3) channel, the premium media content being streamed is encoded, requiring the receiving device to be authenticated by the transmitting device before the encoded content can be received, and requiring the transmitting device to be authenticated by the receiving device before the receiving device will accept the encoded content. The authentication of the two devices is performed by exchanging verification data (e.g., public/private keys). In addition, the receiving device must decipher the encoded content prior to displaying the content using, for instance, a session key received from the transmitting device or generated based on information received from the transmitting device.

A media streaming system implementing HDCP may stream encoded data over multiple channels, each of which require authentication and deciphering by a receiving device before display. The HDCP engine of the receiving device can include a different authentication engine and stream cipher engine for each channel. However, including as many authentication engines and stream cipher engines as channels results in large HDCP engine chips that are expensive to produce. This problem is exacerbated as the number of channels in a media streaming system increases.

SUMMARY

A system for receiving and decrypting media content encrypted according to the HDCP protocol is described herein. A receiving device in an HDCP environment is coupled to a plurality of transmitting devices via, for each transmitting device, a corresponding content channel. Examples of content channels include HDMI channels and MHL3 channels. The receiving device includes an authentication engine configured to sequentially authenticate each of the content channels, for instance based on information received from transmitting devices corresponding to the content channels.

The authentication engine then generates an initial session key for each authenticated channel. Encrypted media content is received on an active content channel. In addition, a session key indicator is received, the session key indicator representative of a current session key used to encrypt a current encrypted frame within the received encrypted media content. The current session key is part of a series of session keys starting with the initial session key corresponding to the active content channel. Each successive session key is generated based on either on the value of the session key before it in the series, or based on the index of the session key in the series.

Current session keys are generated based on the received session key indicator and the initial session key corresponding to an active content channel. For an HDMI active content channel, to generate a current session key, each session key between the initial session key and the current session key in the series of session keys is generated. For an MHL3 active content channel, the current session key is generated without generating each session key between the initial session key and the current session key in the series of session keys. A stream cipher engine then decrypts the received encrypted media content using at least the current session key. To decrypt subsequent frames encrypted with subsequent session keys, the subsequent session keys are generated and used to decrypt the subsequent frames.

When the active content channel changes to a different content channel, a new session key indicator is received representative of the session key used to encrypt content received on the new active content channel. A new current session key is generated based on the initial key associated with the new active content channel and the new session key indicator, and the stream cipher engine decrypts the encrypted content received on the new active content channel. In addition to embodiments with one authentication engine and one stream cipher engine, an HDCP receiving device can include multiple authentication engines and stream cipher engines, for instance two or more, such that the number of content channels coupled to the HDCP receiving device is greater than the number of authentication engines and the number of stream cipher engines.

BRIEF DESCRIPTION OF THE DRAWINGS

Embodiments of the invention are illustrated by way of example, and not by way of limitation, in the figures of the accompanying drawings in which like reference numerals refer to similar elements:

FIG. 1 is a block diagram illustrating an HDCP streaming content environment, according to one embodiment.

FIG. 2 is an interaction diagram illustrating communications between a transmitting device and a receiving device in an HDCP streaming content environment, according to one embodiment.

DETAILED DESCRIPTION

Figure 3:
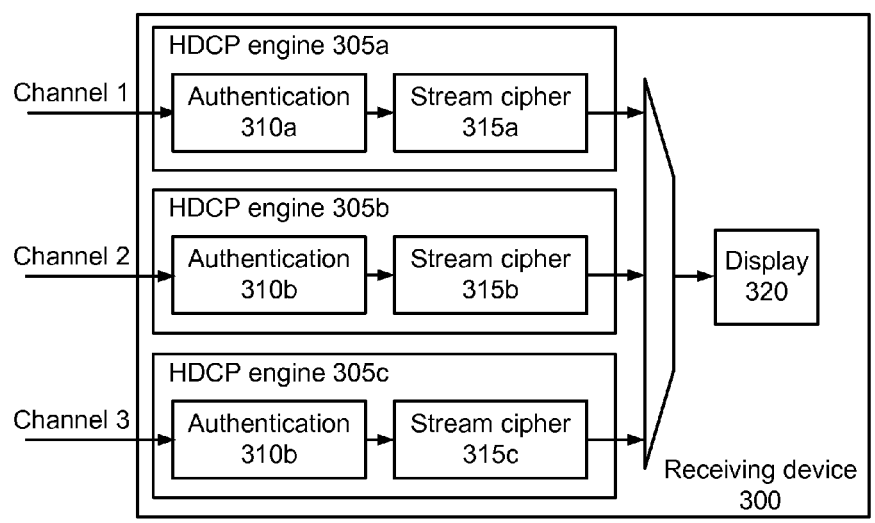
FIG. 3 is a block diagram illustrating a receiving device with one HDCP engine per content channel, according to one embodiment.

As used herein, "network" or "communication network" mean an interconnection network to deliver digital media content (including music, audio/video, gaming, photos, and others) between devices using any number of technologies, such as SATA, Frame Information Structure (FIS), etc. An entertainment network may include a personal entertainment network, such as a network in a household, a network in a business setting, or any other network of devices and/or components. A network includes a Local Area Network (LAN), Wide Area Network (WAN), Metropolitan Area Network (MAN), intranet, the Internet, etc. In a network, certain network devices may be a source of media content, such as a digital television tuner, cable set-top box, handheld device (e.g., personal device assistant (PDA)), video storage server, and other source device. Such devices are referred to herein as "transmitting devices". Other devices may receive, display, use, or store media content, such as a digital television, home theater system, audio system, gaming system, video and audio storage server, and the like. Such devices are referred to herein as "receiving devices". An HDCP streaming content environment includes at least one transmitting device and one receiving device, communicatively coupled by at least one network.

It should be noted that certain devices may perform multiple media functions, such as a cable set-top box that can serve as a receiver (receiving information from a cable head-end) as well as a transmitter (transmitting information to a TV) and vice versa. In some embodiments, the transmitting and receiving devices may be co-located on a single local area network. In other embodiments, the devices may span multiple network segments, such as through tunneling between local area networks. Although content protection as described herein is generally limited to implementations of the HDCP protocol, it should be noted that in various embodiments, an HDCP environment network can also include multiple data encoding and encryption processes, identify verification processes, such as unique signature verification and unique ID comparison, as well as any other suitable data protection technique.

As used herein, "Tx" will be used to refer to a transmitter component specifically or to an HDCP environment transmitting device generally, and "Rx" will be used to refer to a receiving component specifically, or to an HDCP receiving device generally. FIG. 1 is a block diagram illustrating an HDCP streaming content environment, according to one embodiment. In the embodiment of FIG. 1, a transmitting device 100 communicates with a receiving device 105 over a content channel 114 corresponding to the transmitting device. The transmitting device 100 includes a media source 108, an HDCP engine 110, and a transmitter component (Tx) 112. The receiving device 105 includes a receiver component (Rx) 116, an HDCP engine 118, and a media sink 120. It should be noted that in other embodiments, the environment of FIG. 1 can include additional or different components than those illustrated herein.

The media source 108 is configured to store or access media content, for instance from a local or external storage, from a media relay or transmitter, from a media device (such as a camera), or from any other suitable source of media. The media sink 120 is configured to store, play, or display media content, for instance in a local or external storage, on a local or external monitor, or on a media device (such as a mobile phone). It should be noted that for the remainder of the description, the media content protected, transmitted, and displayed within the HDCP environment will be described as video content for the purposes of simplicity, though it should be emphasized that other types of content (such as audio content, images, and the like) can be protected, transmitted, and displayed according to the principles described herein.

The HDCP engine 110 encrypts video content accessed by the media source, and provides the encrypted video content to the transmitter component 112. The transmitter component 112 transmits the encrypted video content to the receiver component 116. The HDCP engine 118 decrypts the encrypted video content received by the receiver component 116, and provides the decrypted video content to the media sink 120 for display.

Prior to transmitting video content, the HDCP engine 110 authenticates the receiving device 105. Prior to receiving video content, the HDCP engine 118 authenticates the transmitting device 100. Further, the HDCP engine 110 tracks the synchronization between the transmitting device 100 and the receiving device 105, for instance by querying an Ri value stored at receiving device 105. The Ri value is a residue value of a shared key between the transmitting device 100 and the receiving device 105 that is updated every frame. The HDCP engine 110 can query the Ri value periodically, for instance every set number of frames (such as 128 frames).

The HDCP engine 110 can include an encryption enable signal (referred to as "ENC_EN") such as a CTL3 signal for each encrypted frame to indicate to the HDCP engine 118 that a frame is an encrypted frame (for instance, for HDMI content channels), or can include a content protection ("CP") control packet to indicate that a frame is an encrypted frame (for instance, for MHL3 content channels). Encryption enable signals and CP control packets can be included in the frame boundary (the non-content portions of a frame) during transmission. It should be noted that in other embodiments not described further herein, the HDCP engine 110 indicates encrypted frames using signals other than encryption enable signals and CP control packets according to the principles described herein.

The HDCP engine 110 and the HDCP engine 118 can pre-authenticate the receiving device 105 and the transmitting device 100, respectively. Pre-authentication eliminates the need to authenticate a content channel corresponding to the transmitting device 100 after the receiving device 105 selects the content channel for receiving content (for example, after the receiving device 105 selects a media source, such as a DVD player or cable television, for display). "Pre-Authentication" as used herein refers to the authentication of a content channel before selecting the content channel 114 as the active content channel (the content channel selected to receive content for display) corresponding to the transmitting device 100.

FIG. 2 is an interaction diagram illustrating communications between a transmitting device and a receiving device in an HDCP streaming content environment, according to one embodiment. In the embodiment of FIG. 2, the transmitting device 100 accesses 200 video content, and provides 205 transmitter device verification data (such as one of a public/private key pair) to the receiving device 105. The receiving device 105 verifies 210 the transmitting device 100 based on the received transmitter verification data 205, and provides 215 receiver verification data to the transmitting device 100 in response.

The transmitting device verifies 220 the receiving device 105 based on the received receiver verification data. The authentication of the transmitting device 100 by the receiving device 105 and vice versa can be performed before the receiving device 105 selects the content channel corresponding to the transmitting device 100 for receiving content ("pre-authentication"), or in response to the selection of the content channel corresponding to the transmitting device.

The transmitting device 100 generates 225 a session key for use in encrypting content, and encrypts 230 video content using the generated session key. The encoded video content is provided 235 to the receiving device 105, and the transmitting device 100 additionally provides 240 a session key indicator representative of a current session key to the receiving device 105. The receiving device 105 generates 245 an initial session key, generates an current session key based on the received session key indicator and the initial session key, and decrypts the received encrypted video content using the generated current session key. It should be noted that while the receiving device 105 is described herein as generating an initial session key (for instance, in an implementation of the HDCP v. 1.4 protocol), in some embodiments, the receiving device receives the initial session key from the transmitting device 100 (for instance, in an implementation of the HDCP 2.2 protocol).

The transmitting device 100 is configured to generate a session key, and to use the session key to encrypt a first frame of video content. The transmitting device then updates the session key according to a pre-defined algorithm, and uses the updated session key to encrypt a second frame of video content. This process is repeated, with each new frame of video being encrypted by a session key generated based on one or more previous session keys. In some embodiments (for example, embodiments implementing HDMI channels), each new session key is dependent on the session key used to encrypt the frame immediately prior to the current frame. In other embodiments (for example, embodiments implementing MHL3 channels), each new session key is dependent on the index of the current frame being encrypted (for instance, if the current frame is the $17^{th}$ frame to be encrypted by a session key, the session key is generated based on the index "17").

A transmitting device 100 can begin encrypting video content before a receiving device 105 is configured to begin decrypting the content. For example, a television can pre-authenticate a DVD player, and the DVD player can begin encrypting video content and transmitting the encrypted video content to the television while the television is configured for playback of video content received from a satellite dish. In this example, a user can switch the input mode of the television from "satellite dish" to "DVD player", in order to begin watching video content from a DVD being played. At this point in time, as the DVD player has been encrypting video frames using successive session keys, the television needs to "catch up" to the current session key being used by the DVD player. The DVD player can provide a session key indicator (such as a CTL3 signal or CP control packet) indicative of a current session key being used (for instance, an index of the session key being used). The television then can either generate each session key between the initial session key and the current session key (for instance, in an embodiment in which the DVD player and television are coupled via an HDMI channel), or can immediately generate the current session key based on the initial session key and the session key index received from the DVD player (for instance, in an embodiment in which the DVD player and the television are coupled via an MHL3 channel).

Generally, a receiving device includes one dedicated HDCP engine per content channel. FIG. 3 is a block diagram illustrating a receiving device with one HDCP engine per content channel, according to one embodiment. The receiving device 300 of FIG. 3 includes three content channels, channels 1-3, each associated with an HDCP engine. The HDCP engine 305a is communicatively coupled to channel 1, the HDCP engine 305b is communicatively coupled to channel 2, and the HDCP engine 305c is communicatively coupled to channel 3.

Each HDCP engine includes an authentication engine 310 and a stream cipher engine 315. As described above, the authentication engine 310 authenticates a transmitting device corresponding to the content channel to which the authentication engine is communicatively coupled. In response to the authentication, the HDCP engine 305 generates or receives an initial session key, and the stream cipher engine decrypts received encrypted video data using the initial session key or a current session key generates based at least in part on the initial session key. It should be noted that the HDCP engine only decrypts encrypted video data if the content channel associated with the HDCP engine is active (in other words, if a user of the receiving device selects the video source corresponding to the content channel for viewing). The decrypted video data is then displayed by the display 320.

In the embodiment of FIG. 3, multiple HDCP engines are included within the receiving device, each configured to authenticate a single content channel, and to decrypt content received from the content channel. Such a configuration results in extra chip real estate required to decrypt video received over multiple content channels, and increasing chip manufacturing costs. Instead of using one HDCP engine for each content channel, a single HDCP engine can be used to authenticate multiple content channels and to decrypt encrypted content received on the multiple content channels.

Figure 4:
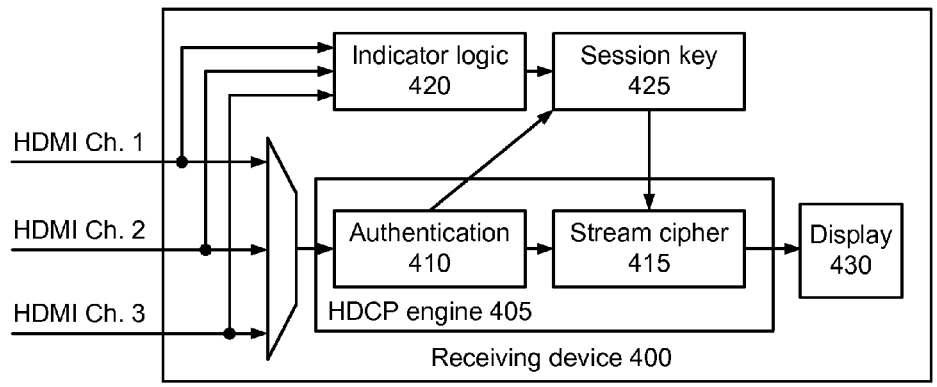
FIG. 4 is a block diagram illustrating a receiving device with one HDCP engine for multiple HDMI content channels, according to one embodiment.

FIG. 4 is a block diagram illustrating a receiving device with one HDCP engine for multiple HDMI content channels, according to one embodiment. In the embodiment of FIG. 4, a receiving device 400 includes one HDCP engine 405 for authenticating three content channels, HDMI channel 1, HDMI channel 2, and HDMI channel 3. The authentication engine 410 of the HDCP engine 405 sequentially pre-authenticates each of the three content channels. In embodiments with an active HDMI channel, the authentication engine 410 can first authenticate the active channel, and can subsequently authenticate the other HDMI channels.

The authentication engine 410 generates an initial session key for each of the HDMI channels, and provides the initial session keys to the session key engine 425. For an active HDMI channel, encrypted content is received from the active HDMI channel, and a multiplexor is used to forward the received encrypted content to the HDCP engine 405. The authentication engine provides the received encrypted content to the stream cipher engine 415, though it should be noted that in other embodiments, the encrypted content is received from the content channel directly at the stream cipher engine. The active HDMI channel provides a session key indicator to the receiving device 400 representative of a session key in a series of session keys used to encrypt video content. The session key indicator is received at the indicator logic 420. The indicator logic 420 identifies the session key from the series of session keys used to generate a received current encrypted frame, and the session key engine 425 generates a current session key used to encrypt the current encrypted frame received at the HDCP engine 405 based on the initial session key received from the authentication engine 410 and the identified session key from the indicator logic 420. In the embodiment of FIG. 4, the session key engine generates a current session key using a pre-determined algorithm configured to generate each session key in a series of session keys from the initial session key until the current session key is generated. In this embodiment, each session key is dependent on the value of the session key before it in the series of session keys, and so each session key in the series of session keys up to the current session key must be generated in order to generate the current session key.

The stream cipher engine 415 receives the encrypted content and decrypts the encrypted content using the current session key received from the session key engine 425. The decrypted content is then provided to a display 430 (such as a television monitor) in the embodiment of FIG. 4, though it should be noted that in other embodiments, the decrypted content can be stored or provided to an external playback device.

Figure 5:
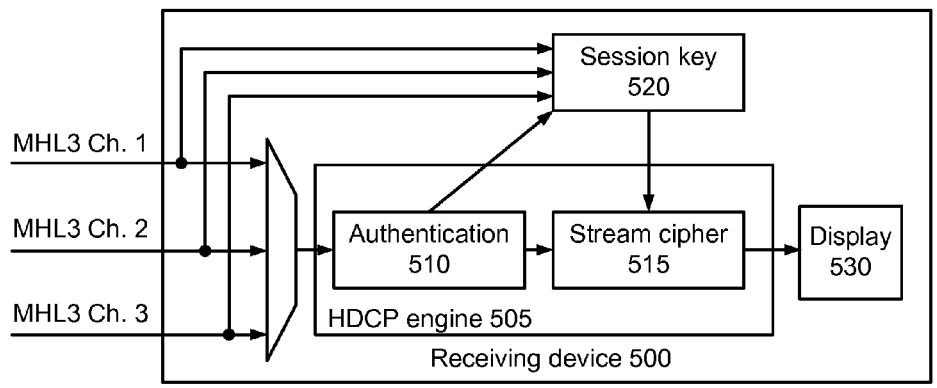
FIG. 5 is a block diagram illustrating a receiving device with one HDCP engine for multiple MHL3 content channels, according to one embodiment.

FIG. 5 is a block diagram illustrating a receiving device with one HDCP engine for multiple MHL3 content channels, according to one embodiment. The embodiment of FIG. 5 is similar to the embodiment of FIG. 4 (a receiving device 500 includes three content channels and one HDCP engine 505), but the content channels of the embodiment of FIG. 5 are MHL3 channels.

When each MHL3 channel is authenticated by the authentication engine 510, the authentication engine generates and provides an initial session key for each MHL3 channel to the session key engine 520. An active MHL3 channel then provides encrypted content to the HDCP engine 505, and provides a session key index indicating a current number of encrypted frames provided by the active MHL3 channel to the session key engine 520. The session key engine 520 then generates a current session key used to encrypt a current encrypted frame received at the HDCP engine 505 based on the initial session key associated with the active MHL3 channel and based on the session key index received from the active MHL3 channel. The session key engine 520 then generates the current session key without having to generate each session key between the initial session key and the current session key. The stream cipher 515 then decrypts the received encrypted content using the current session and provides the decrypted content for display on the display 530.

Figure 6:
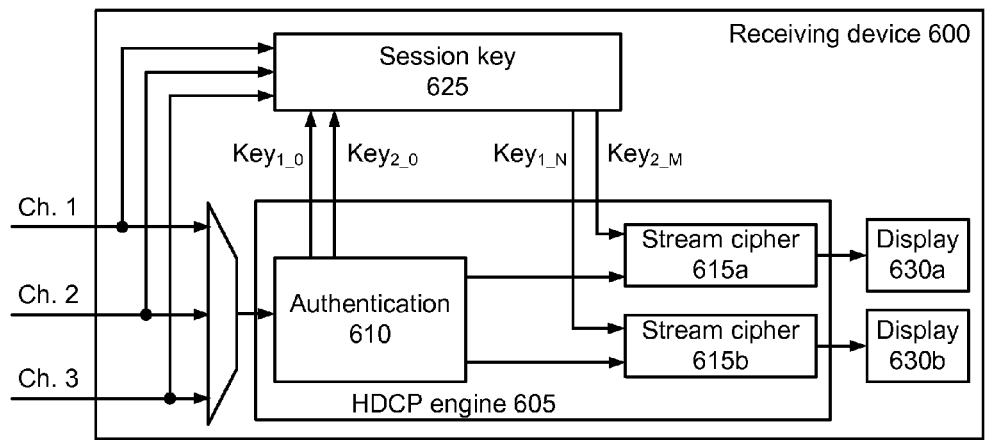
FIG. 6 is a block diagram illustrating a receiving device with one HDCP engine for multiple content channels, the HDCP engine including one stream cipher engine for each of multiple displays, according to one embodiment.

FIG. 6 is a block diagram illustrating a receiving device with one HDCP engine for multiple content channels, the HDCP engine including one stream cipher engine for each of multiple displays, according to one embodiment. The embodiment of FIG. 6 includes two displays, display 630a and 630b, allowing a user or multiple users to watch two different videos at the same time. The authentication engine 610 authenticates each content channel (channels 1, 2, and 3), and provides initial session keys (for instance, one initial session key per channel, or one initial session key per channel per display) to the session key engine 625. In the embodiment of FIG. 6, the authentication engine 610 provides a first initial session key $Key_{1\_0}$ (associated with display 630b) and a second initial session key $Key_{2\_0}$ (associated with display 630a) to the session key engine 625. It should be noted that although only a single multiplexor is shown in the embodiment of FIG. 6 (configured to output data from a selected channel to the authentication engine 610), some embodiments can include a second multiplexor configured to output data from a selected channel directly to one of stream cipher engine 615a or 615b.

The HDCP engine 605 includes two stream cipher engines, 615a and 615b, for decrypting received encrypted content and outputting the decrypted content to a corresponding display, display 630a or 630b, respectively. Upon receiving encrypted content from an active content channel, the stream ciphers 615a and 615b access current sessions keys associated with received current encrypted frames from the session key engine 625. In the embodiment of FIG. 6, the stream cipher 615a receives a current session key $Key_{2\_M}$ for use in decrypting a current frame received by the stream cipher 615a, and the stream cipher 615b receives a current session key $Key_{1\_N}$ for use in decrypting a current frame received by the stream cipher 615b.

The architecture of FIG. 6 beneficially allows two encrypted video streams to be decrypted and displayed simultaneously on two different displays, without requiring the use of more than one authentication engine 610 specifically, or more than one HDCP engine 605 generally. In some embodiments, the architecture of FIG. 6 can scale such that the HDCP engine 605 includes a different stream cipher engine for each of any number of displays. For example, if the receiving device 600 corresponds to four displays, the HDCP engine 605 can include four stream cipher engines. Alternatively, if the receiving device 600 corresponds to four displays, the receiving device can include two HDCP engines, each including two stream cipher engines, such that the total ratio of active displays to stream cipher engines is 1:1. In some embodiments, the receiving device 600 includes one stream cipher engine for each of a maximum number of displays that will display content from a different content channel simultaneously. For example, if the receiving device 600 includes four displays, but will only have a maximum of three displays displaying content from different channels simultaneously, the receiving device can include three stream cipher engines.

It should be noted that upon generating a current session key and providing the current session key to a stream cipher engine, a session key engine can subsequently generate additional updated session keys, such as subsequent session keys used to encrypt subsequent encrypted frames received after the current encrypted frame. It should also be noted that the embodiments of FIGS. 4-6 can include additional, fewer, or different components than those illustrated herein. It should also be noted that in some embodiments, each receiving device can include more than one HDCP engine, but fewer HDCP engines than content channels (for instance, a receiving device can include one HDCP engine for every two content channels). In some embodiments, a receiving device includes fewer authentication engines and/or stream ciphers than content channels. Finally, in some embodiments, for a receiving device with a first number of content channels, fewer than the first number of authentication engines can be implemented to generate an initial session key for each of the content channels, and can provide the generated initial session keys to the stream cipher engines.

Figure 7:
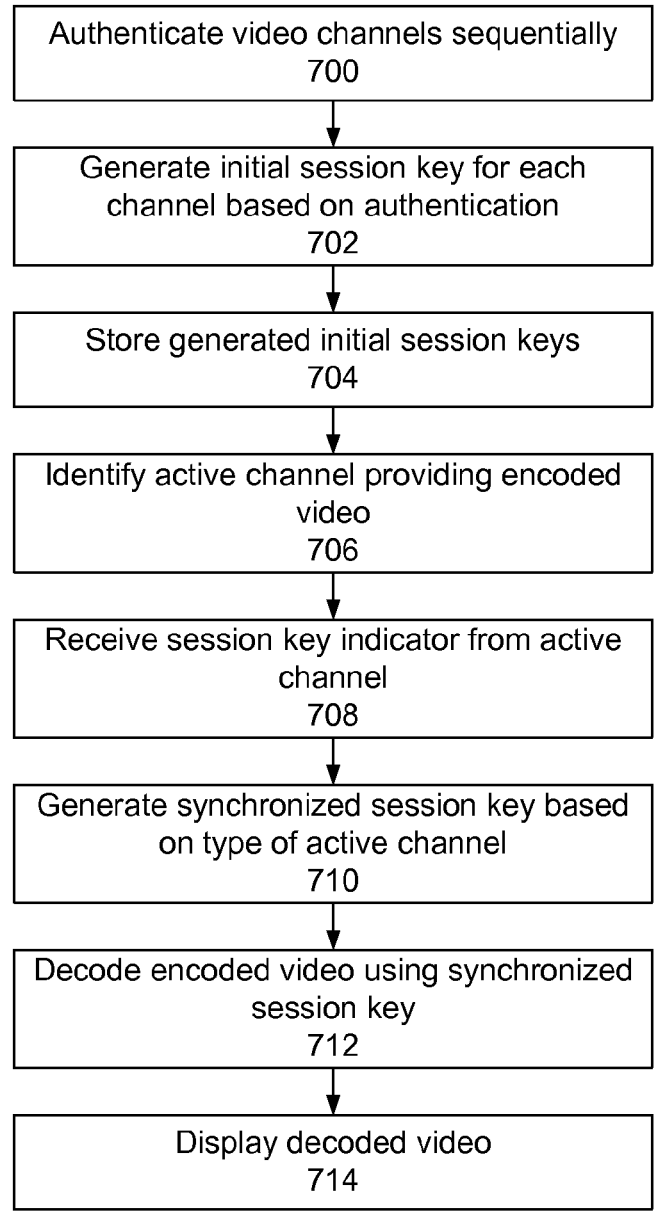
FIG. 7 is a flow chart illustrating a process for authenticating and deciphering encoded HDCP content in a receiving device with a plurality of content channels and one HDCP engine, according to one embodiment.

FIG. 7 is a flow chart illustrating a process for authenticating and deciphering encoded HDCP content in a receiving device with a plurality of content channels and one HDCP engine, according to one embodiment. It should be noted that although the method of the embodiment of FIG. 7 is described with regards to one HDCP engine, the method of FIG. 7 applies equally to embodiments with any number of HDCP engines less than the number of content channels corresponding to the receiving device.

An HDCP engine in a content receiving device authenticates 700 content channels corresponding to the receiving device sequentially. In some embodiments, the HDCP engine can authenticate content channels in a pre-determined order, or based on a content channel priority. The HDCP engine generates 702 an initial session key corresponding to each content channel in response to the authentication of the content channels, and stores 704 the generated initial session keys.

An active content channel providing encrypted video including a current encrypted video frame is identified 706, and a session key indicator is received 708 from the active content channel indicating a session key index representative of a current session key used to encrypt a current received encrypted frame. A current session key is generated 710 based on the initial session key corresponding to the active content channel and based on the received session key indicator. The received encrypted video is decrypted 712 using the generated current session key and subsequently generated session keys generated based on the current session key, and the decrypted video is displayed 714.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. One of ordinary skill in the art will understand that the hardware, implementing the described modules, includes at least one processor and a memory, the memory comprising instructions to execute the described functionality of the modules.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based herein. Accordingly, the disclosure of the embodiments is intended to be illustrative, but not limiting.

What is claimed is:

1. An apparatus comprising:
  a plurality of content channel inputs, each content channel input corresponding to a content channel and an associated transmitting device, each transmitting device configured to encrypt media content according to the High-Definition Content Protection (HDCP) protocol and to provide the encrypted media content to the corresponding content channel input via the associated content channel;
  an authentication engine implemented by a hardware processor and configured to sequentially authenticate each content channel and, for each authenticated content channel, to generate an initial session key corresponding to the authenticated content channel;
  a session key indicator input configured to receive a session key indicator from a transmitting device associated with an active content channel providing encrypted media content comprising a current encrypted frame, the session key indicator representative of a current session key used to encrypt the current encrypted frame;
  a session key engine configured to generate the current session key based on the received session key indicator and the initial session key corresponding to the active content channel; and
  a stream cipher engine configured to decrypt the encrypted media content using at least the generated current session key.

2. The apparatus of claim 1, wherein at least one content channel comprises a High-Definition Multimedia Interface (HDMI) channel.

3. The apparatus of claim 2, wherein, when the active content channel is the HDMI channel, the received session key indicator comprises a CTL3 signal.

4. The apparatus of claim 3, wherein generating the current session key comprises generating each session key in a series of session keys, wherein the first session key in the series of session keys comprises the initial session key corresponding to the active content channel, wherein each subsequent key in the series of session keys is based on the previous session key, and wherein the last session key in the series of session keys comprises the current session key.

5. The apparatus of claim 1, wherein at least one content channel comprises a Mobile High-Definition Link (MHL) channel.

6. The apparatus of claim 5, wherein, when the active content channel is the MHL channel, the received session key indicator comprises a CP control packet.

7. The apparatus of claim 6, wherein the initial session key corresponding to the active content channel and the current session key are part of a series of session keys, and wherein generating the current session key comprises generating the current session key without generating session keys in the series of session keys between the initial session key corresponding to the active content channel and the current session key.

8. The apparatus of claim 1, further comprising a second stream cipher engine, the stream cipher engine corresponding to a first media playback device, the second stream cipher engine corresponding to a second media playback device and configured to decrypt second encrypted media content received from a second active content channel using a second current session key generated based at least in part on an initial session key corresponding to the second active content channel, the first media playback device configured to display the decrypted media content and the second media playback device configured to display the decrypted second media content substantially simultaneously.

9. A method comprising:
authenticating, using an authentication engine implemented by a hardware processor, each of a plurality of content channels in sequence, each content channel corresponding to a transmitting device, each transmitting device configured to encrypt media content according to the HDCP protocol and to provide the encrypted media content via the corresponding content channel;
generating, by the authentication engine, an initial session key corresponding to each of the authenticated content channels;
receiving encrypted media content on an active content channel of the plurality of content channels, the received encrypted media content comprising a current encrypted frame;
receiving a session key indicator representative of a current session key used to encrypt the current encrypted frame;
generating the current session key based on the initial session key corresponding to the active content channel and the received session key indicator; and
decrypting, using a stream cipher engine, the received encrypted media content using at least the generated current session key.

10. The method of claim 9, wherein at least one content channel comprises an HDMI channel.

11. The method of claim 10, wherein, when the active content channel is the HDMI channel, the received session key indicator comprises a CTL3 signal.

12. The method of claim 11, wherein generating the current session key comprises generating each session key in a series of session keys, wherein the first session key in the series of session keys comprises the initial session key corresponding to the active content channel, wherein each subsequent key in the series of session keys is based on the previous session key, and wherein the last session key in the series of session keys comprises the current session key.

13. The method of claim 9, wherein at least one content channel comprises an MHL channel.

14. The method of claim 13, wherein, when the active content channel is the MHL channel, the received session key indicator comprises a CP control packet.

15. The method of claim 14, wherein the initial session key corresponding to the active content channel and the current session key are part of a series of session keys, and wherein generating the current session key comprises generating the current session key without generating session keys in the series of session keys between the initial session key corresponding to the active content channel and the current session key.

16. The method of claim 9, further comprising:
receiving second encrypted media content on a second active content channel of the plurality of content channels, the received second encrypted media content comprising a second current encrypted frame;
receiving a second session key indicator representative of a second current session key used to encrypt the second current encrypted frame;
generating the second current session key based on the initial session key corresponding to the second active content channel and the received second session key indicator;
decrypting, using a second stream cipher engine, the received second media content using at least the generated second current session key; and
displaying the decrypted media content on a first display and the decrypted second media content on a second display substantially simultaneously.

17. An apparatus comprising:
a plurality of content channel inputs each configured to receive media content encrypted according to the HDCP protocol over a corresponding content channel; and
an HDCP engine implemented at least in part by a hardware processor comprising:
an authentication engine configured to sequentially authenticate each content channel and to generate an initial session key corresponding to each authenticated content channel; and
a stream cipher engine configured to decrypt encrypted media content received at an active content channel input based at least in part on a current session key generated at least in part on the generated initial session key corresponding to the content channel corresponding to the active content channel input.

18. The apparatus of claim 17, wherein at least one content channel comprises an HDMI channel, and wherein, when the active content channel input is the content channel input corresponding to the HDMI channel, the current session key is generated based on a received CTL3 signal representative of the current session key.

19. The apparatus of claim 17, wherein at least one content channel comprises an MHL channel, and wherein, when the active content channel input is the content channel input corresponding to the MHL channel, the current session key is generated based on a received CP control packet representative of the current session key.

20. The apparatus of claim 17, wherein the HDCP engine further comprises:
a second stream cipher engine configured to decrypt second encrypted media content received at a second active content channel input based at least in part on a second current session key generated at least in part on the generated initial session key corresponding to the content channel corresponding to the second active content channel input;
wherein the stream cipher engine and the second stream cipher engine are configured to output the decrypted media content and the decrypted second media content substantially simultaneously.

* * * * *